(12) United States Patent
Smoot et al.

(10) Patent No.: US 10,693,201 B2
(45) Date of Patent: Jun. 23, 2020

(54) THERMAL MANAGEMENT OF ENERGY STORAGE DEVICES VIA OSCILLATING HEAT PIPES

(71) Applicant: ThermAvant Technologies, LLC, Columbia, MO (US)

(72) Inventors: Christopher D. Smoot, Columbia, MO (US); Joe Boswell, San Francisco, CA (US); Corey A. Wilson, Jefferson City, MO (US)

(73) Assignee: ThermAvant Technologies, LLC, Columbia, MO (US)

( * ) Notice: Subject to any disclaimer, the term of this patent is extended or adjusted under 35 U.S.C. 154(b) by 225 days.

(21) Appl. No.: 15/840,708

(22) Filed: Dec. 13, 2017

(65) Prior Publication Data
US 2018/0166757 A1 Jun. 14, 2018

Related U.S. Application Data

(60) Provisional application No. 62/433,613, filed on Dec. 13, 2016.

(51) Int. Cl.
| | |
|---|---|
| *H01M 10/6552* | (2014.01) |
| *H01M 10/613* | (2014.01) |
| *H01M 10/6555* | (2014.01) |
| *H01M 10/643* | (2014.01) |
| *H01M 10/625* | (2014.01) |
| *H01M 2/20* | (2006.01) |

(52) U.S. Cl.
CPC ....... *H01M 10/6552* (2015.04); *H01M 2/206* (2013.01); *H01M 10/613* (2015.04); *H01M 10/625* (2015.04); *H01M 10/643* (2015.04); *H01M 10/6555* (2015.04); *H01M 2220/20* (2013.01)

(58) Field of Classification Search
CPC .......... H01M 10/6552; H01M 10/613; H01M 10/643; H01M 10/6555
See application file for complete search history.

(56) References Cited

U.S. PATENT DOCUMENTS

| | | | |
|---|---|---|---|
| 4,921,041 A | 5/1990 | Akachi | |
| 2014/0186675 A1* | 7/2014 | Boettcher | H01M 2/1077 429/99 |
| 2018/0145382 A1* | 5/2018 | Harris | H01M 10/6567 |

FOREIGN PATENT DOCUMENTS

CN 105280978 A * 1/2016

\* cited by examiner

*Primary Examiner* — Jonathan G Jelsma
(74) *Attorney, Agent, or Firm* — Sandberg Phoenix & von Gontard, P.C.

(57) ABSTRACT

A thermal management system for the at least one energy cell. The thermal management system includes a cold plate cell holder comprising at least one energy cell reservoir structured to retain the energy cell(s) and surround at least a first portion of a surface of the energy cell(s), and to thermally cool the energy cell(s). The system additionally includes a bus bar header to which one or more bus bar can be physically and thermally connected, and at least one oscillating heat pipe (OHP) cover disposable around a second portion of the surface of the energy cell(s). The OHP cover(s) is/are thermally and mechanically connectable to the cold plate cell holder when disposed around the energy cell(s). The OHP cover(s) is/are structured and operable to thermally cool the energy cell(s) via heat absorption from the second portion of the surface of the energy cell(s) when disposed around the energy cell(s).

18 Claims, 11 Drawing Sheets

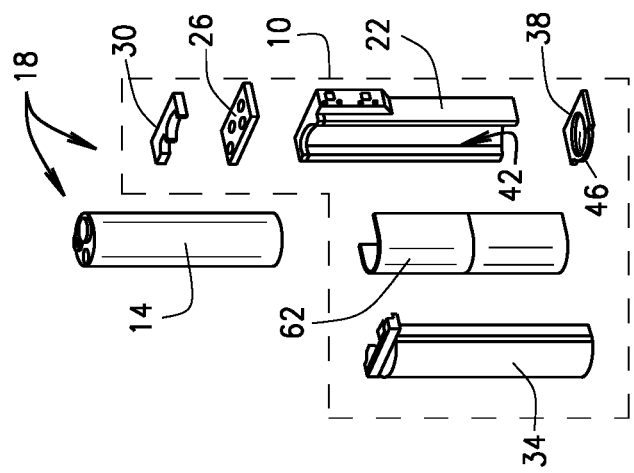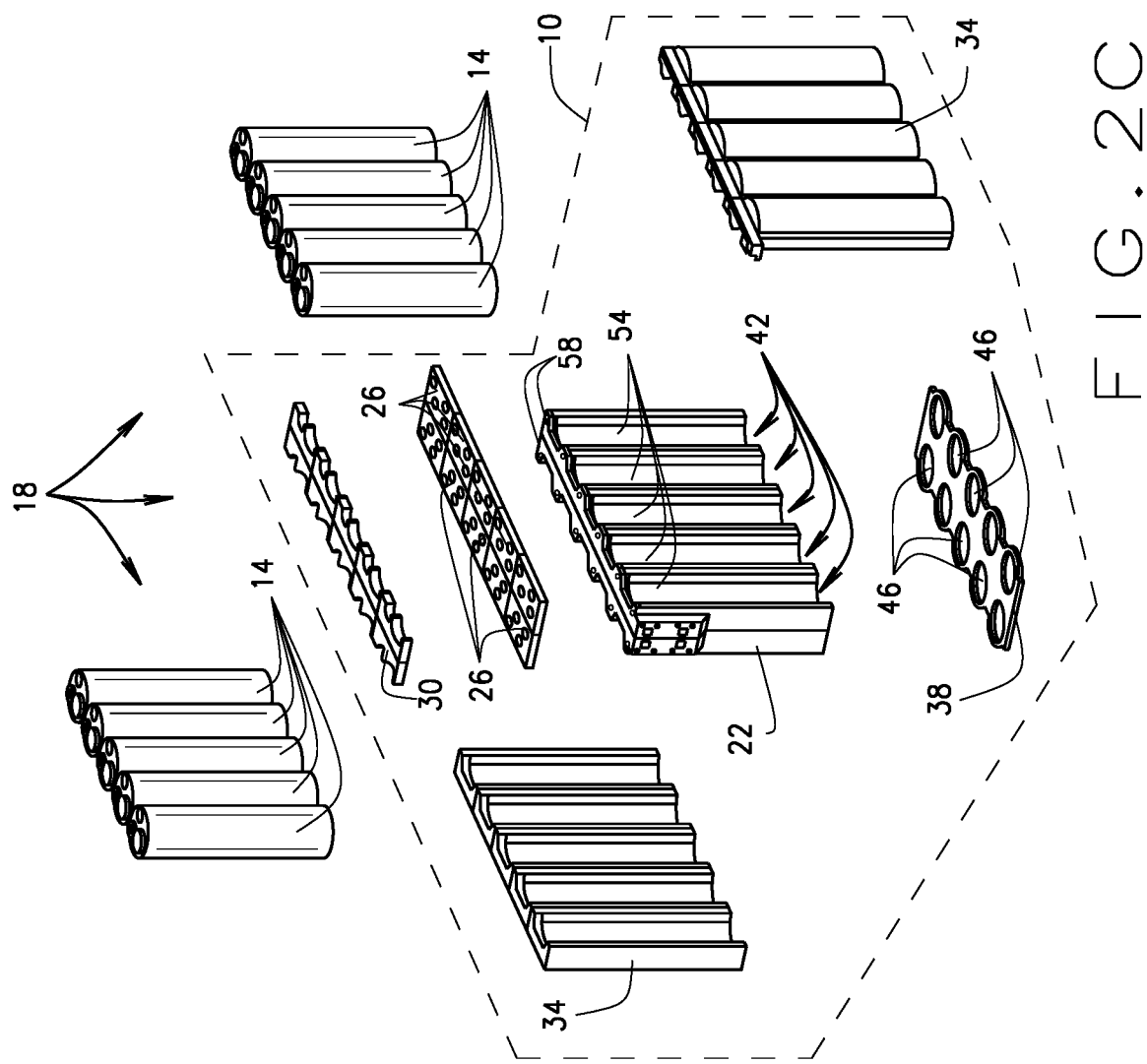

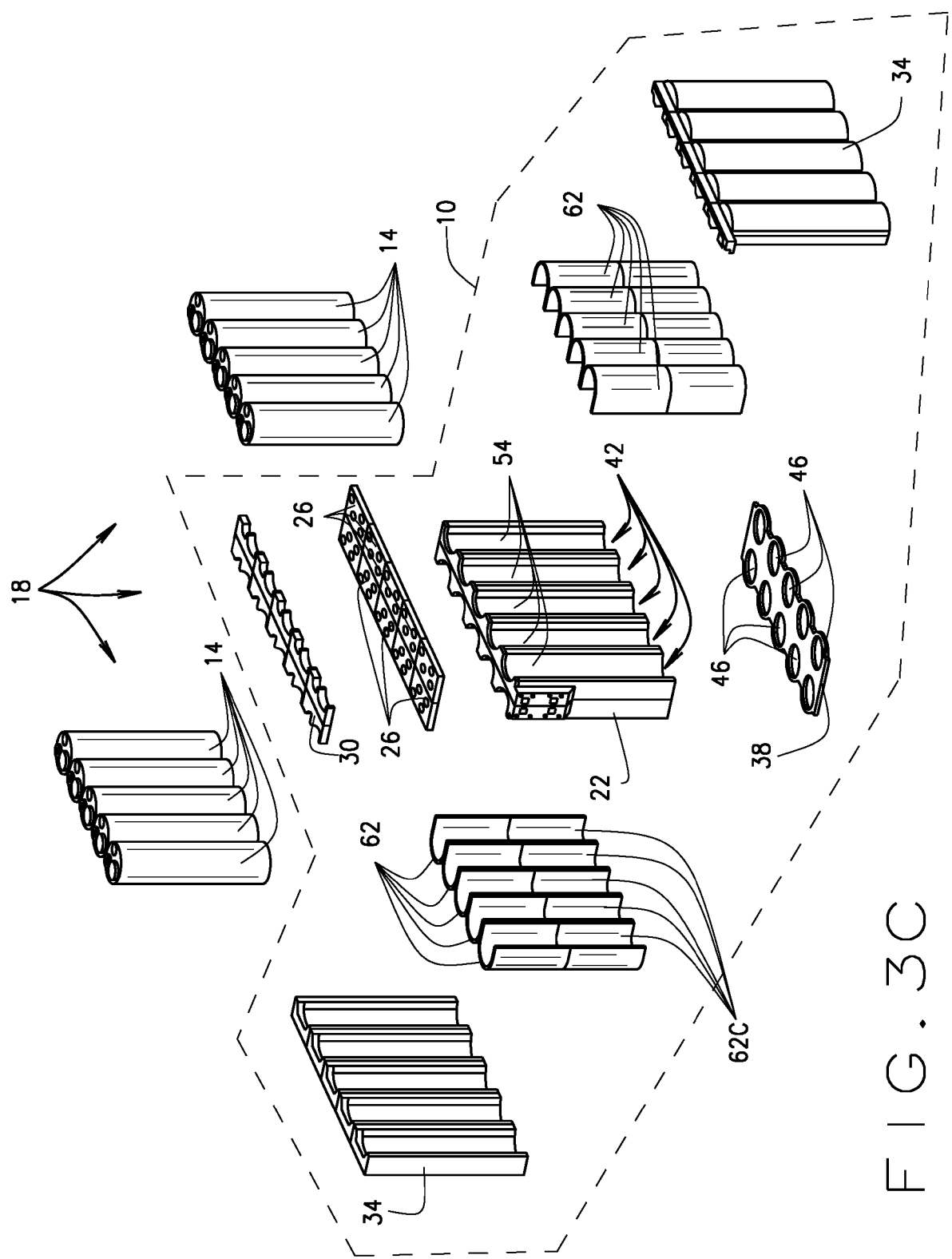

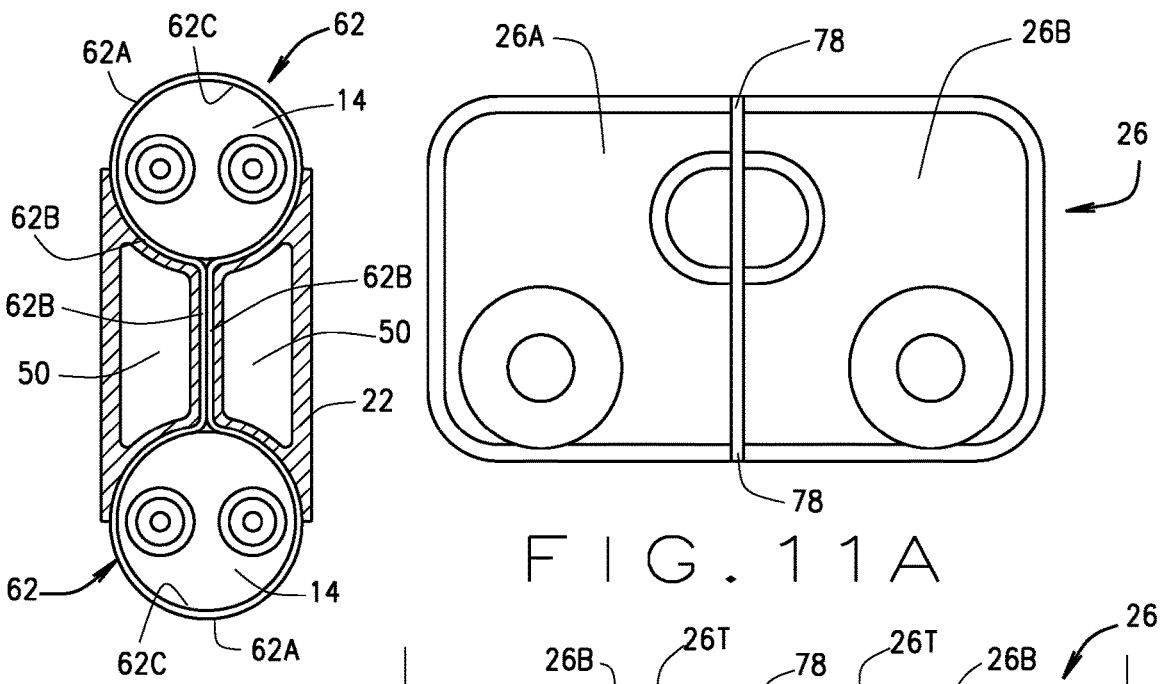
FIG. 10
FIG. 11A
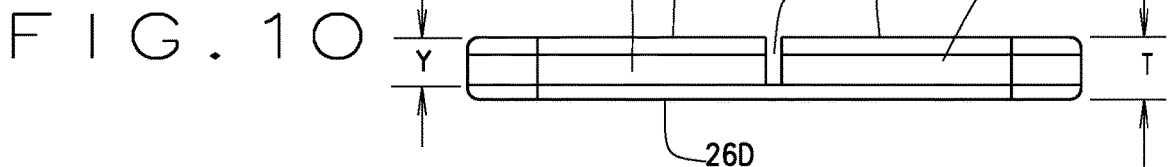
FIG. 11B
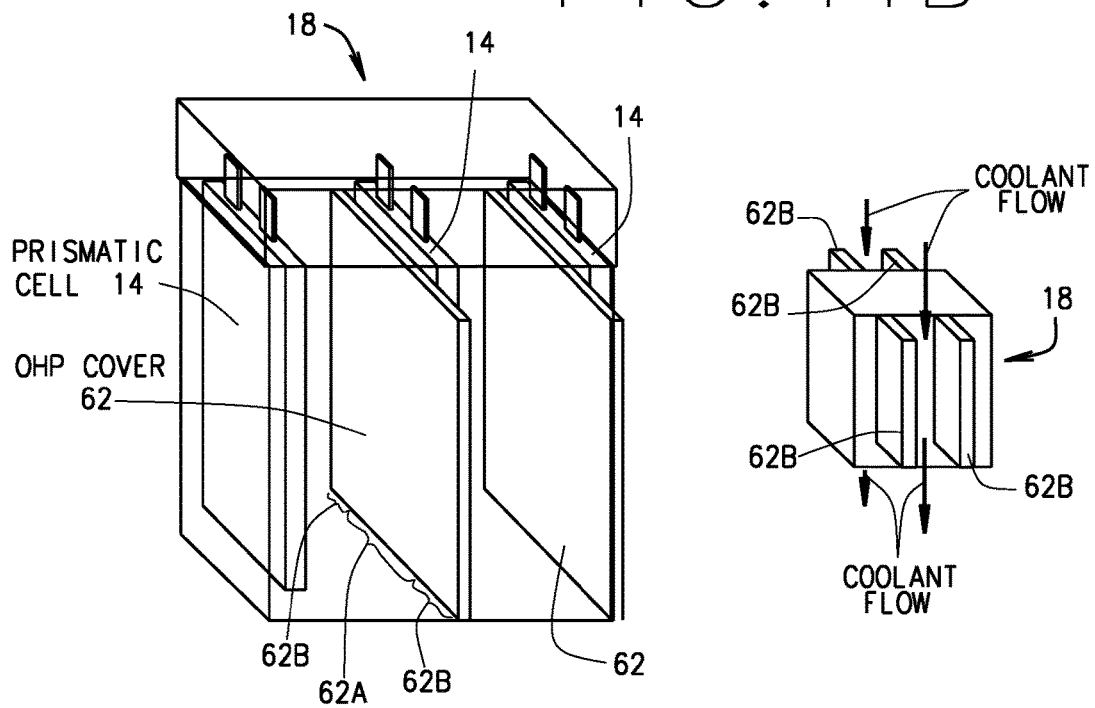
FIG. 12

THERMAL MANAGEMENT OF ENERGY STORAGE DEVICES VIA OSCILLATING HEAT PIPES

CROSS-REFERENCE TO RELATED APPLICATIONS

This application claims the benefit of U.S. Provisional Application No. 62/433,613, filed on Dec. 13, 2016. The disclosure of the above application is incorporated herein by reference in its entirety.

GOVERNMENT RIGHTS

This invention was developed in the course of work under U.S. Office of Naval Research contract number N00014-13-P-1147. The U.S. Office of Naval Research may possess certain rights in the invention.

FIELD

The present teachings relate to oscillating heat pipes, and more particularly to oscillating heat pipe systems that are used to thermally manage energy storage devices.

BACKGROUND

The statements in this section merely provide background information related to the present disclosure and may not constitute prior art.

Cylindrical energy storage devices, such as lithium ion cells, offer significant challenges in cooling due to their shape, electrical potential and potential failure modes (e.g., cells get too hot or too cold). Typically, such lithium ion cells are limited in maximum temperature before degradation of the interior components threatens not only their operation and lifespan, but also the safety of the system utilizing the cells. At high operating temperatures, the reaction rate within the cells increases causing increased heat generation due to joule heating. If the temperatures rise high enough, the reaction rate increases to an uncontrollable level, creating a positive feedback loop (e.g., thermal runaway) where temperature rise can rapidly leading to a violent release of energy. While thermal runaway can be caused by excess temperatures, it can also be caused by other factors, such as overcharging, over-discharging, short circuiting (both internal or external), and cell damage. Additionally, often a plurality of cells are packaged together such that the cells are not thermally isolated from adjacent cells. In such instances the failure of a single cell (e.g., thermal runaway of a single cell) can propagate to one or more adjacent cells in the package. The challenge of minimizing the propagation of heat from one cell to adjacent cell(s) is particularly difficult in densely packaged battery with multiple cells. Further, with power density (e.g., W per kg, W per $cm^3$) of the battery being a critical metric in size and space applications with increasing power needs, it is useful for energy storage coolers to be compact, lightweight, low thermal resistance, and safe in case of one or a few cells go into thermal runaway. Finally, in some applications it is difficult to operate energy cells at low temperatures, and it is preferable to have a low thermal resistance method to quickly raise temperature of cells and improve their efficiency or operability. While many known thermal management methods and systems for energy storage systems can satisfy one or two of the abovementioned features, none simultaneously keep densely packaged cells at desirable temperatures while insulating such cells from neighboring cells that may go into thermal runaway.

SUMMARY

In various embodiments, the present disclosure provides a thermal management solution for energy storage systems in a compact and safe form factor by integrating oscillating heat pipe (OHP) into a thermal-mechanical package so that individual elements of the energy storage system are thermally connected to a heating or cooling media to keep cells at their desired temperature while isolating individual elements from one another in case one element goes into thermal runaway.

For example, in various embodiments, the present disclosure provides a thermal management system for the at least one energy cell, wherein the thermal management system includes a cold plate cell holder. In various instances the cold plate cell holder comprises at least one energy cell reservoir that is structured to retain the energy cell(s) and surround at least a first portion of a surface of the energy cell(s). The cold plate cell holder is structured and operable to thermally cool the energy cell(s) via heat absorption from the first portion of the surface of the energy cell(s). Additionally, in various instances, the system additionally includes a bus bar header to which one or more bus bar of the system can be physically and thermally connected. Furthermore, in various instances the system includes at least one oscillating heat pipe (OHP) cover that is disposable around a second portion of the surface of the energy cell(s) when the energy cell(s) is/are retained within the cold plate cell holder. The OHP cover(s) is/are thermally and mechanically connectable to the cold plate cell holder when disposed around the energy cell(s). The OHP cover(s) is/are structured and operable to thermally cool the energy cell(s) via heat absorption from the second portion of the surface of the energy cell(s) when disposed around the energy cell(s).

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 1 is a side view of a power utilization device (exemplarily illustrated as a vehicle) comprising an electrical energy storage cell thermal management system of the present disclosure, such as that illustrated in FIGS. 2 through 11B, that is structured and operable to cool one or more electrical energy cells of an electrical power storage device, in accordance with various embodiments of the present disclosure.

FIG. 2C is an exploded view of a multiple cell embodiment of the electrical energy storage cell thermal management system shown in FIG. 1, in accordance with yet other various embodiments of the present disclosure.

FIG. 3A is an exploded view of a single cell embodiment of the electrical energy storage cell thermal management system shown in FIG. 1, in accordance with still other various embodiments of the present disclosure.

FIG. 3C is an exploded view of a multiple cell embodiment of the electrical energy storage cell thermal management system shown in FIG. 1, in accordance with further various embodiments of the present disclosure.

FIG. 10 is a cross-sectional view of a portion of a portion of the electrical energy storage cell thermal management system shown in FIGS. 1 through 7B, wherein an oscillating heat pipe cover of the thermal management system encompasses a plurality of energy cells disposed in the thermal management system, in accordance with various embodiments of the present disclosure.

Figure 1:
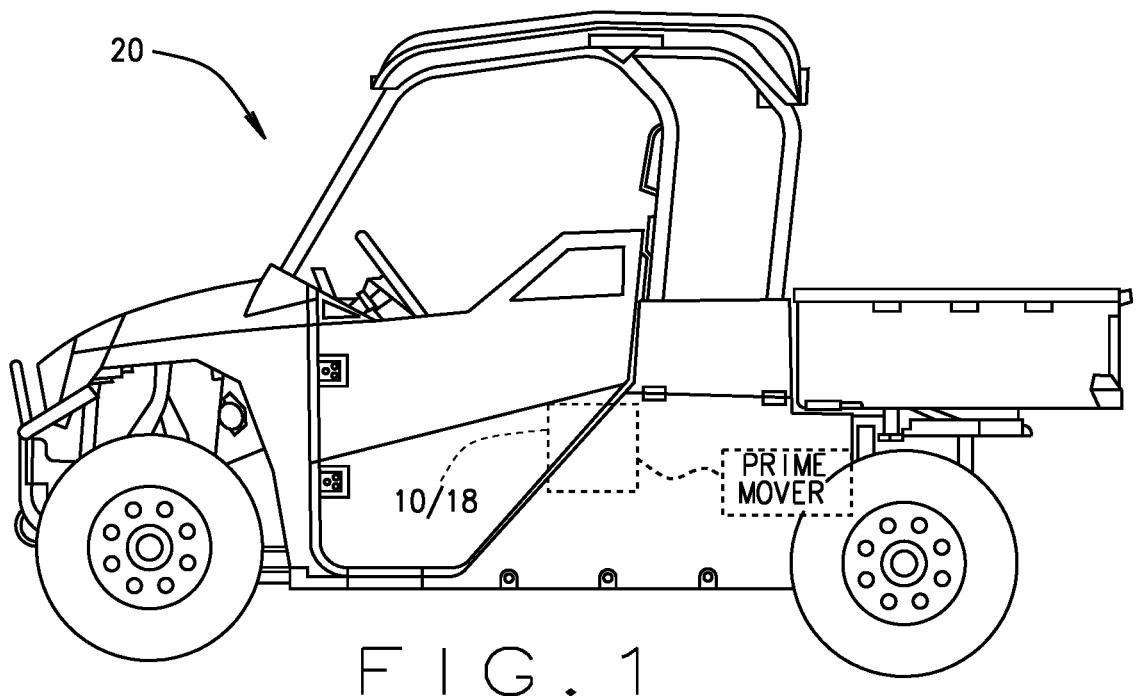
Figures 2A, 2B:
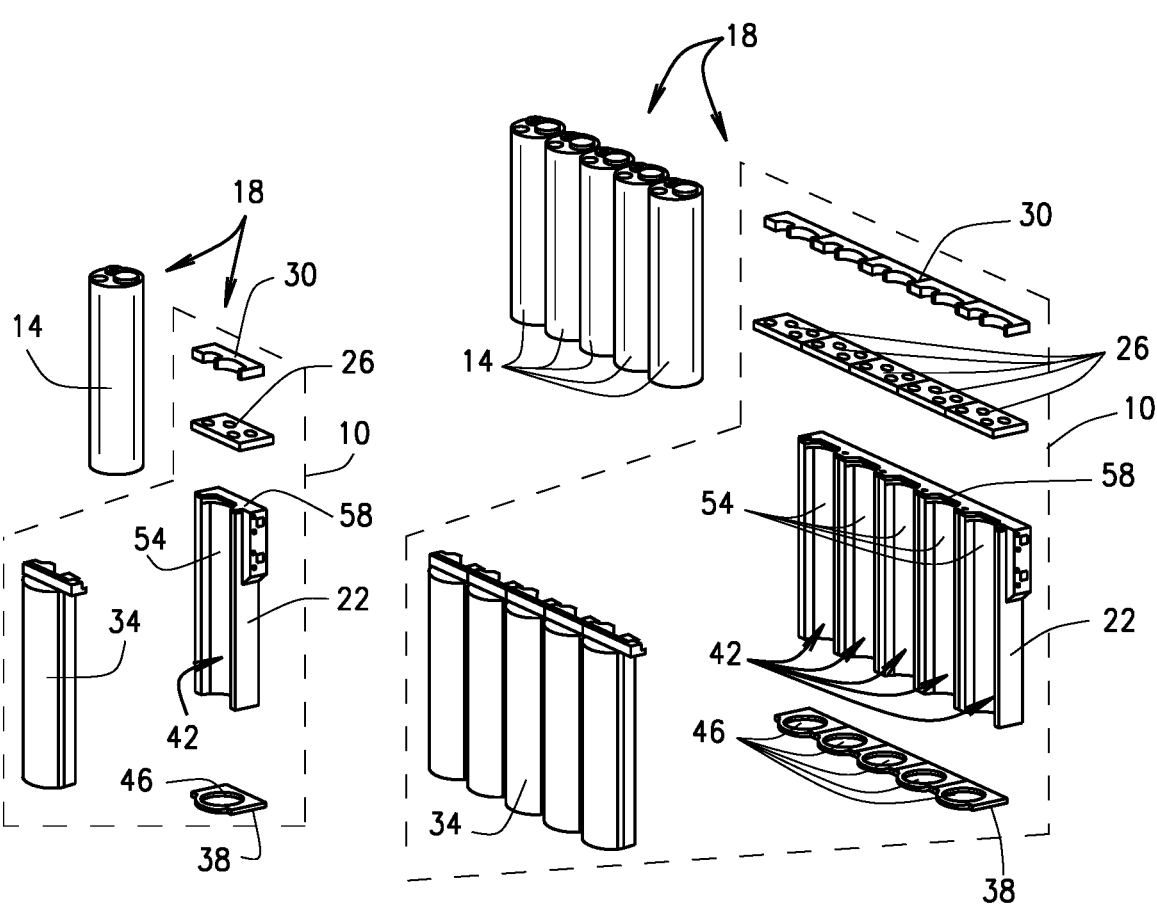
FIG. 2A is an exploded view of a single cell embodiment of the electrical energy storage cell thermal management system shown in FIG. 1, in accordance with various embodiments of the present disclosure.
FIG. 2B is an exploded view of a multiple cell embodiment of the electrical energy storage cell thermal management system shown in FIG. 1, in accordance with other various embodiments of the present disclosure.
Figure 3B:
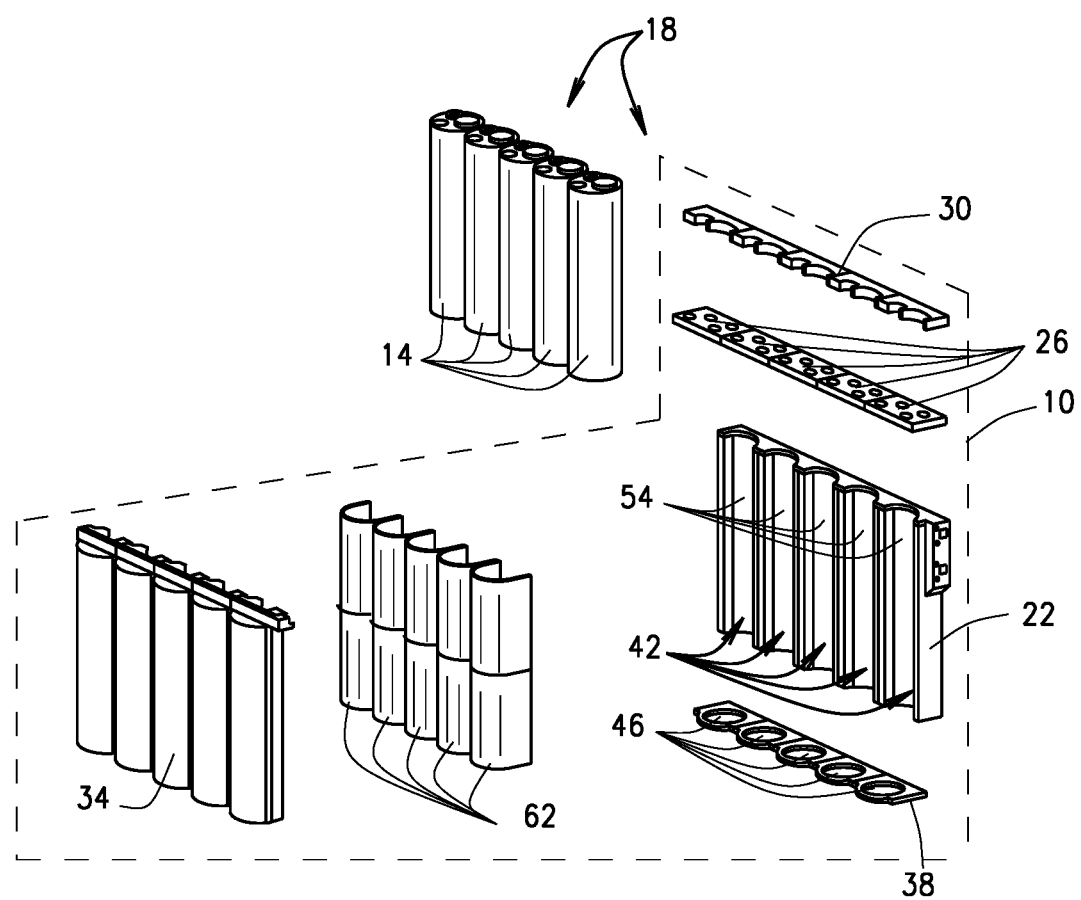
FIG. 3B is an exploded view of a multiple cell embodiment of the electrical energy storage cell thermal management system shown in FIG. 1, in accordance with still yet various embodiments of the present disclosure.
Figure 4A:
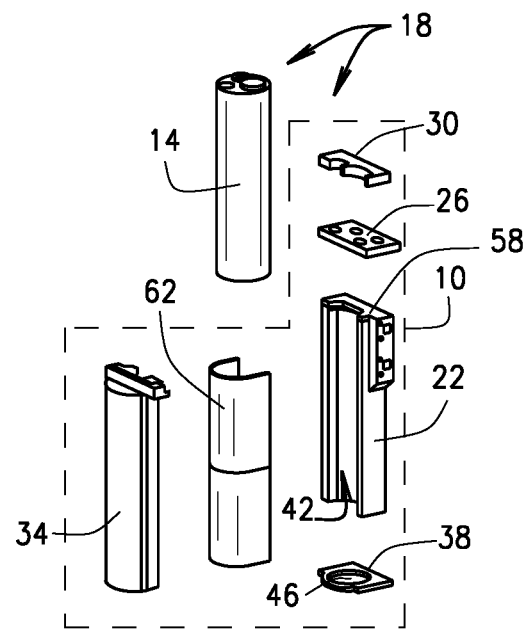
FIG. 4A is an exploded view of a single cell embodiment of the electrical energy storage cell thermal management system shown in FIG. 1, in accordance with yet further various embodiments of the present disclosure.
Figure 4B:
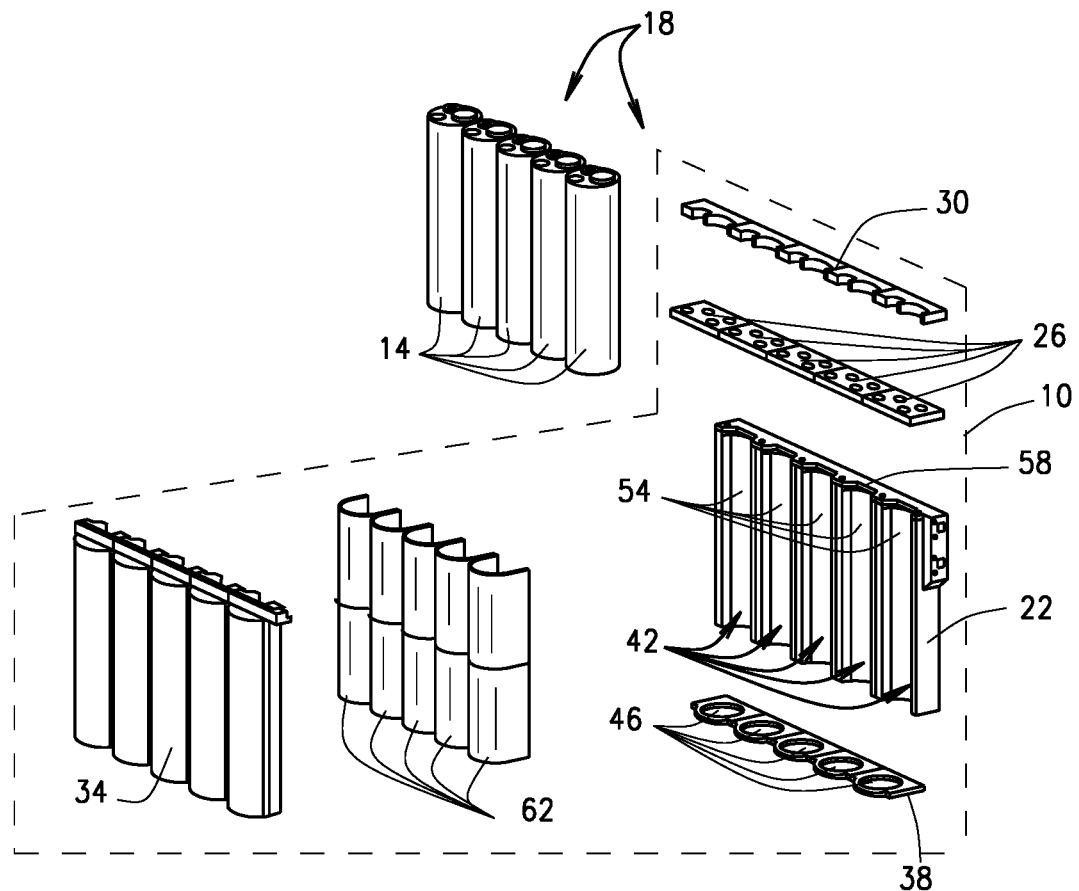
FIG. 4B is an exploded view of a multiple cell embodiment of the electrical energy storage cell thermal management system shown in FIG. 1, in accordance still further various embodiments of the present disclosure.
Figure 4C:
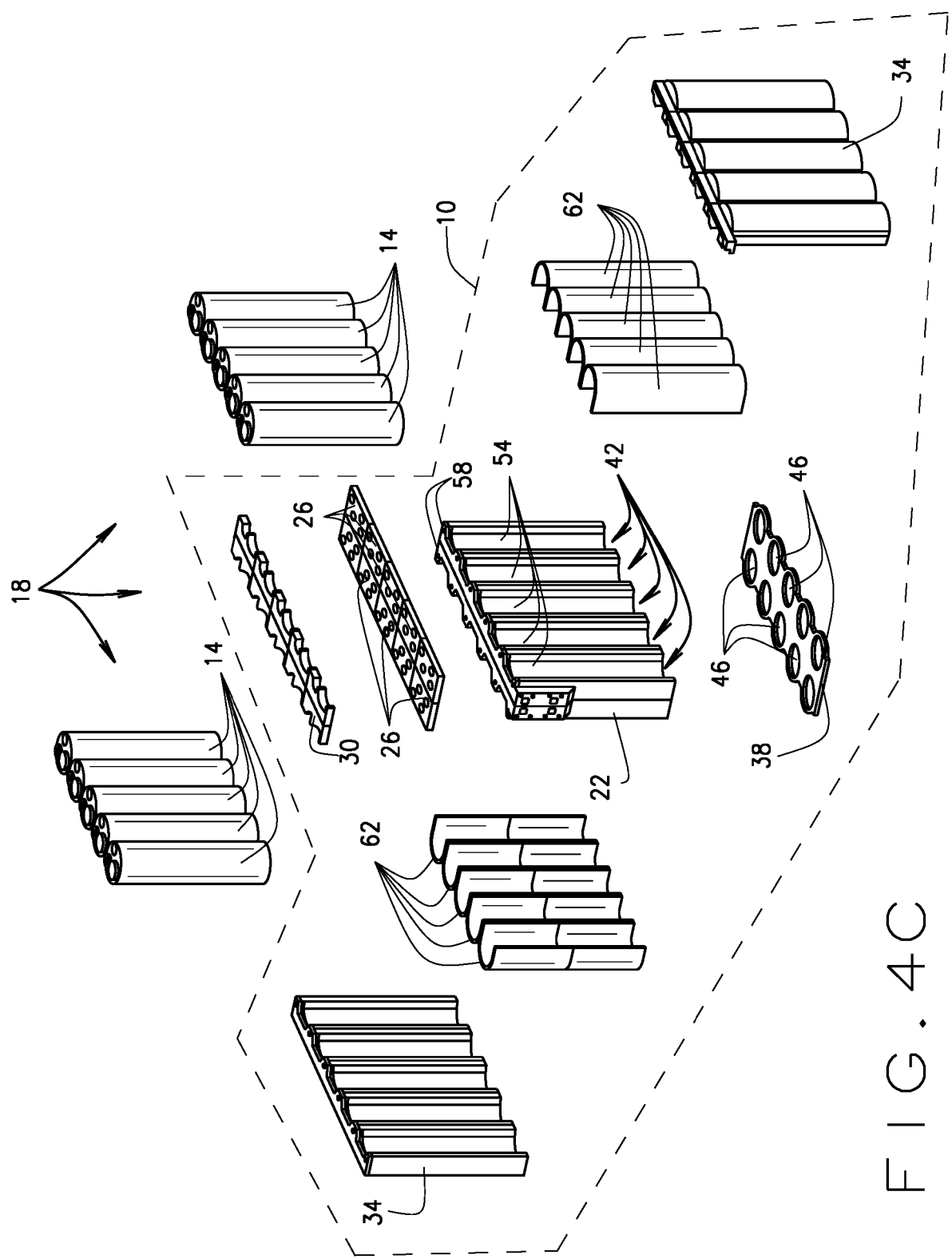
FIG. 4C is an exploded view of a multiple cell embodiment of the electrical energy storage cell thermal management system shown in FIG. 1, in accordance with still yet further various embodiments of the present disclosure.

FIGS. 11A and 11B respectively illustrate a top view and a side view of a bus bar of the electrical energy storage cell thermal management system shown in FIGS. 1 through 10.

FIG. 12 is an illustration of the electrical energy storage cell thermal management system shown in FIGS. 1 through 11B, wherein the energy storage cells have a prismatic shape, in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and can include simplified conceptual views to facilitate understanding or explanation. As well, the relative size and arrangement of the components can differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

An oscillating heat pipe (OHP or pulsating heat pipe) is a passive heat transfer device that transports heat using two-phase fluid flow within capillary-sized tubes or tunnels (i.e., tubes or tunnels sized such that they have a capillary effect on a working fluid disposed therein) which have a meandering, tortuous path traveling between areas of the device in thermal contact with one or more heat sources and one or more heat sinks. The volume of the tunnel pattern is partly filled with a working fluid and hermetically sealed from the outside environment. The tunnel's hydraulic diameter must be small enough and the surface tension of the working fluid great enough such that the fluid disperses itself throughout the tunnel interior area in discrete liquid "plugs" and vapor "bubbles" (i.e. capillary action).

In operation, the OHPs transfer heat from the heat source area(s) to the heat sink(s) as follows: the working fluid (also called cooling fluid) partially evaporates and expands in the tunnel areas at or near the heat source area(s); the associated expansion working fluid vapor forces or drives the working fluid vapor axially in tunnels from the heat source area(s) toward the lower temperature, lower pressure heat sink area(s) where incoming fluid vapor rejects its heat, condenses back to a fluid, and contracts; as a result the working fluid initially near the heat sink area(s) is dislodged by the incoming fluid and is directed through the tunnel's tortuous path toward heat source area(s); and the cycle repeats as the working fluid and working fluid vapor oscillates between the tunnel areas in thermal contact with the heat source(s) and the area in thermal contact with the heat sink(s).

OHPs utilize both the phase change heat transfer (i.e. evaporation and condensation) and convection heat transfer (i.e. oscillating fluid mass flows with changing temperatures) of the working fluid, and have been proven capable of very high heat transport capacities across a broad range of heat loads and operating conditions. Furthermore, OHPs can be made from a wide range of material and fluid combinations and in a variety of shapes and sizes in order to meet the specifications of a given application's heat source(s) and heat sink(s) (e.g. their sizes, heat loads, heat fluxes, locations, temperatures, gravitational fields, coefficients of thermal expansion requirements, etc.).

The OHP's tunnel patterns can form a closed-loop (e.g. circulating), or they can be sealed at each end to form an open-loop (e.g. serpentine or linear). However, closed-loop tunnel patterns are considered more reliable, but more difficult to manufacture than open-loop patterns. Furthermore, OHP's tunnel patterns can travel in two dimensions (i.e. in x-y plane if in a body-like pattern, or in a disk-like pattern in the r-θ plane) or in all three physical dimensions (i.e. x-y-z and/or r-θ-h). Tunnel cross-sections can be effective in many shapes (e.g., circular, semi-circle, rectangle, square, etc.) and tunnel lengths can vary (e.g., from less than 10 cm to greater than 1 m) so long as they maintain the capillary effect where the working fluid inside the tunnel volume is dispersed in discrete liquid "plugs" and vapor "bubbles". Generally, the closer packed the tunnels are (and the greater the number of turns in the meandering tunnel pattern) the better the thermal performance.

OHPs (closed-loop and open-loop), when charged with working fluids, have proven effective at transferring heat within the tunnels when the internal tunnel volume is filled from 10% to 90% with working fluid. Working fluids can be selected based on their thermophysical properties (e.g. vapor pressures, latent heats, specific heats, densities, surface tensions, critical temperatures, pour points, viscosities, dielectric strength, etc.). An OHP designer often will select the working fluid(s) for a given application's specifications, then design the OHP's tunnel size(s) and flow path(s) to be compatible with selected working fluid(s). Selected fluids must, however, be compatible with the material(s) used to form the tunnel path(s) and instabilities or reactions from electro-chemical mismatches between fluids and materials are to be avoided. Material selection criteria include, but are not limited to, thermal conductivity, density, temperature stability, strength, hardness, ductility, manufacturability (i.e. ease of shaping, cutting, bending, and attaching to itself or other materials), coefficient of thermal expansion, cost, availability, porosity, dielectric properties etc. Importantly, OHP operation varies based on its operating conditions, and one known limit to operation is the temperature of the working fluid which must be above its melting point and below its critical point in order for the OHPs liquid-vapor phase change events to occur and sustain internal fluid flow and thus heat transfer. More specifically, in an OHP with internal channels or tunnels of a fixed diameter: before the temperature of the working fluid approaches the critical temperature the Bond number limit will be met and the two-phase heat transfer operation of the OHP will degrade and fail.

Regarding the external shape, size, and contours of an OHP-based heat transfer device (i.e., the form factors), it is advantageous that the shape of the heat transfer device have a surface that attaches intimately to the heat source(s) and to the heat sink(s), and the most common surfaces. The internal OHP tunnel patterns can be formed using a variety of manufacturing methods including, but not limited to: winding tubing into a serpentine or circulatory pattern (and such tubing can then be attached to separate flat body(s) material with grooves into which the tubing can be partially or fully enclosed); forming grooves on or through a flat body(s) and then sealing those grooves with a lid(s) or cover body(s); and utilizing additive manufacturing techniques to inherently form tunnels within a solid body (e.g. 3D-printing, direct metal laser sintering/melting, stereolithography, ultrasonic additive manufacturing, electron beam freeform fabrication, etc.).

Referring now to FIGS. 1, 2A, 2B, 2C, 3A, 3B, 3C, 4A, 4B and 4C, the present disclosure provides a thermal management system 10 that is structured and operable to cool one or more electrical energy cells 14 (e.g., lithium ion battery(ies), lithium-air battery(ies) lead acid battery(ies), zinc-carbon battery(ies), zinc-air battery(ies), etc.). When the energy cell(s) 14 is/are installed, or retained, within the thermal management system 10, the resulting combination will be referred to herein as an electrical power storage device 18. The power storage device 18 is structured and operable to provide electrical power to any device, system, mechanism, apparatus, component, platform, etc., 20 that utilizes electrical power (e.g., current and voltage) to operate and enable the functionality of any such device, system, mechanism, apparatus, component, platform, etc., or any component, subsystem or portion thereof. For simplicity, such devices, systems, mechanisms, apparatuses, components, platforms, etc., will be referred to herein simply as electrical power utilization devices 20. For example, the power storage device 18, and hence the thermal management system 10, can be installed in, and provide the electrical power needed to operate power utilization devices 20 such as a weapons system, a light or laser system, an electric vehicle, a land, sea or space vehicle (manned or unmanned) propulsion system, a computer, a drone, a flashlight, an electric motor, a radio, a cell phone, a satellite phone, a navigation system, a heater, a cooler or refrigerator, etc.

As exemplarily illustrated in FIG. 1, in various embodiments, the power storage device 18, and hence the thermal management system 10, can be installed in an electrical power utilization device 20, such as a vehicle and utilized to provide electrical power to at least a primer mover (e.g., an electric motor) of the vehicle. The exemplary illustration of FIG. 1 showing the power storage device 18, and hence the thermal management system 10, utilized in an electric vehicle, is merely exemplary and in no way intended to limit the scope of the present disclosure.

Referring now to FIGS. 2A, 2B, 2C, 3A, 3B, 3C, 4A, 4B and 4C, the thermal management system 10 is structured and operable (as described below) to cool (e.g., extract heat) from the energy cell(s) 14 in order to maintain the temperature of energy cell(s) 14 within a desired operating range. An advantage of maintaining the temperature of the energy cell(s) 14 within the desired operating range is to prevent, reduce or slow degradation of the energy cell(s) 14, and additionally to reduce the risk of thermal runaway of one or more of the energy cell(s) 14. In various embodiments, as described further below, the thermal management system 10 is additionally structured and operable to thermally isolate each energy cell 14 from other energy cells 14 in the power storage device 18, thereby isolate thermal run-away of any one or more energy cell 14 from any adjacent, or other, energy cell(s) 14. That is, should the reaction rate and temperature of an energy cell 14 increase to the point where the reaction rate within the respective energy cell 14 increases to an uncontrollable level, creating a positive feedback loop (e.g., 'thermal runaway'), the thermal management system 10 will prevent or inhibit the propagation of heat from the runaway energy cell 14 to an adjacent, or other, energy cell 14, and thereby prevent or inhibit potential runaway of the adjacent, or other, energy cell 14.

In various embodiments, the thermal management system 10 can generally include a cold plate cell holder 22 (often referred to herein as simply the cold plate 22), one or more bus bar 26, at least one bus bar cover 30, at least one cell cover 34, and at least one bottom plate 38. The energy cell(s) 14 can have any desired shape (e.g., cylindrical, a hexahedron, an octagonal prism, an ellipsoid, etc.) and any desired known or unknown electro-chemical composition (e.g., lithium ion, lithium-air lead acid, zinc-carbon, zinc-air, etc. The cold plate 22 is structured to removably retain the energy cell(s) 14. Particularly, the cold plate 22 comprises one or more cell reservoir 42 is/are structured to receive and retain one or more of the energy cells 14 of the thermal management system 10. The cell reservoir(s) 42 is/are structured, shaped or formed to have substantially the same geometric shape as the energy cell(s) 14 to be disposed therein, such that interface walls 54 (best shown in FIGS. 2A, 2B and 2C) of each cell reservoir 42 substantially conforms to the shape of the respective energy cell(s) 14 to be disposed therein. More specifically, each cell reservoir 42 is structured, shaped or formed such that, when one or more energy cell(s) 14 is/are disposed within a respective cell reservoir 42, a large portion (e.g., 100%, 95%, 90%, 85%, 80%, etc.) of an outer surface of the portion of the respective energy cell 14 that is disposed within the respective cell reservoir 42 is in good thermally conductive contact with the interface wall 54 of the respective cell reservoir 42. For example, in various instances wherein the energy cell(s) 14 is/are cylindrical, the cold plate 22 cell reservoir(s) 42 are structured, shaped or formed to have semi-cylindrical (or any other portion of a cylinder) shape, such that a large portion (e.g., 100%, 95%, 90%, 85%, 80%, etc.) of the surface area of the outer surface of the portion of the energy cell(s) 14 that is/are disposed within the respective cell reservoir(s) 42 is in good thermally conductive contact with the interface wall 54 of the respective cell reservoir 42. Although the various figures exemplarily illustrate that each cell reservoir 42 is structured to receive and retain a single corresponding energy cell 14, each cell reservoir 42 can be structured to receive and retain a plurality of energy cells 14 (e.g., 2 or more energy cells 14) and remain within the scope of the present disclosure.

Each bus bar 26 is fabricated from a highly electrically conductive material (e.g., copper) and is fixed or connected to the cold plate 22 (via any suitable fixing/connection means) such that when the energy cell(s) 14 is/are disposed in the respective cell reservoir(s) 42, the terminals of the energy cell(s) 14 contact one or more bus bar 26. Additionally, one or more of the bus bars 26 is electrically connectable to a power input of the power utilization device 20 in which the power storage device 18, and hence the thermal management system 10, can be installed. Therefore, when the power storage device 18, and hence the thermal management system 10, is installed in the power utilization device 20, electrical energy stored in the energy cell(s) 14 can be transferred from the energy cell(s) 14 to the utilization device 20.

The at least one bus bar cover 30 is fabricated of an electrically insulating material and is structured to be removably connectable to the cold plate 22. The at least one bus bar cover 30 is operable to cover the bus bar(s) 26 and to provide an electrically insulating barrier between the bus bar(s) 26 and the environment external to the power storage device 18. The at least one cell cover 34 is also fabricated of an electrically insulating material and structured to be removably connected to the cold plate 22. The at least one cell cover 34 is operable to cover at least the side(s) of the energy cell(s) 14, to at least assist in retaining the energy cell(s) 14 within the respective cell reservoir(s) 42, and to provide an electrically insulating barrier between the energy cell(s) 14, the bus bar(s) 26 and the environment external to the power storage device 18. It is envisioned that the each cell cover 34 can be a single piece or multi-piece structure and remain within the scope of the present disclosure. The at least one bottom plate 38 is also fabricated of an electrically insulating material and structured to be removably connected to the cold plate 22 and/or the one or more cell cover 34. The at least one bottom plate 38 is operable to cover at least the bottom of the energy cell(s) 14 to and to provide an electrically insulating barrier between the energy cell(s) 14 and the environment external to the power storage device 18. In various instances, the bottom plate(s) 38 can include a heat vent 46 extending through the bottom plate(s) 38 for each respective energy cell 14 of the power storage device 18. The heat vent(s) 46 is/are structured and operable to allow heat from the energy cell(s) 14 to be rejected into the ambient environment external to the power storage device 18, thereby providing a certain amount of cooling to the respective energy cell(s) 14. It is envisioned that the each bottom plate 38 can be a single piece or multi-piece structure and remain within the scope of the present disclosure.

Figure 5:
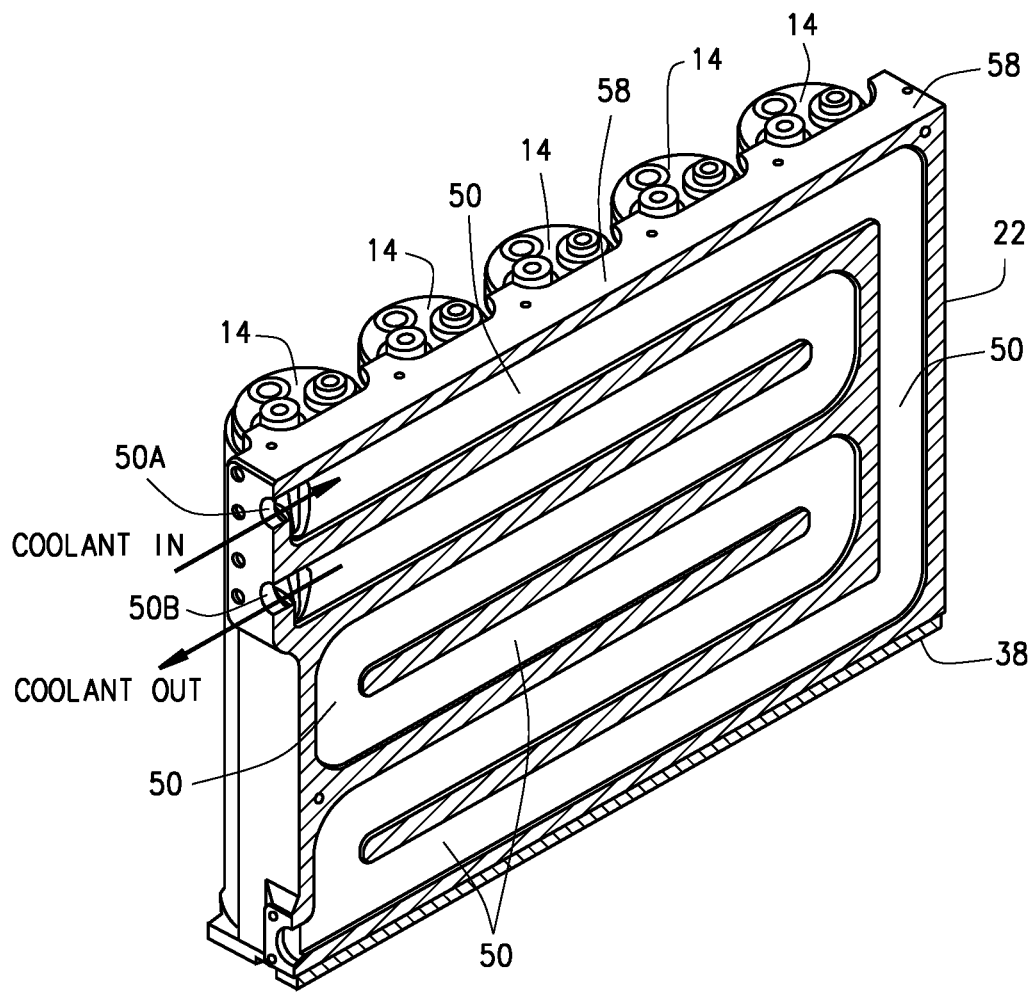
FIG. 5 is a cross-sectional view of an exemplary coolant cooled cooling plate of the electrical energy storage cell thermal management system shown in FIGS. 1 through 4C, in accordance with various embodiments of the present disclosure.

Referring now to FIG. 5, the cold plate 22 is structured and operable to be a coolant cooled heat sink for the energy cell(s) 14 disposed within the cell reservoir(s) 42 of the cold plate 22. The coolant can be any desired coolant (e.g., liquid, gas, refrigerant, or any other type of known and unknown coolant) that can be circulated through a coolant channel 50 that meanders through an interior of the cold plate 22. In various instances, the coolant channel 50 can be a multi-pass cooling loop (e.g., in a serpentine shaped channel) that meanders back and forth through an interior of the cold plate 22. Particularly, the coolant is circulated through the coolant plate 22, via the coolant channel 50, to remove heat from the cold plate 22 that is generated by the energy cell(s) 14 disposed within the cell reservoir(s) 42 of the cold plate 22 and absorbed by the cold plate 22, thereby cooling the energy cell(s) 14. More specifically, the heat generated by energy cell(s) 14 is removed from the energy cell(s) 14 by the cold plate 22 (i.e., absorbed by the cold plate 22) via the thermally conductive contact of the exterior surface of the energy cell(s) 14 with the interface wall(s) 54 of the respective cell reservoir(s) 42, whereafter the heat from the cold plate 22 is removed (i.e., absorbed) from the cold plate 22 by the coolant circulating through internal coolant channel 50, thereby cooling the energy cell(s) 14.

As described above, each cell reservoir 42 is structured, shaped or formed such that, when one or more energy cell(s) 14 is/are disposed within a respective cell reservoir 42, a large portion (e.g., 100%, 95%, 90%, 85%, 80%, etc.) of an outer surface of the portion of the respective energy cell 14 that is disposed within the respective cell reservoir 42 is in good thermally conductive contact with the interface wall 54 of the respective cell reservoir 42. The coolant channel comprises an inlet 50A and outlet 50B. The coolant flows, or is pumped or otherwise injected into the coolant channel 50 from a coolant source (not shown), via the coolant channel 50A. Subsequently, the coolant flows through the coolant channel 50A, whereafter the coolant exits the coolant channel 50 via the outlet 50A. In various instances, the inlet 50A and outlet 50 can be connected to a cooling and recirculation device or system (e.g., a refrigeration device or system) whereby the heated coolant that exits the cold plate 22 is cooled and recirculated, then pumped back into the cold plate cooling channel 50 via the cooling channel inlet 50A.

Referring now to FIGS. 2A, 2B, 2C and 5, in various embodiments, the cold plate 22 is structured or formed to comprise a bus bar header 58 (best shown in FIG. 5, by way of example only) that is formed or disposed along a top side of the cold plate 22 and to which the bus bars 26 are connected. The bus bar header 58 is structured or formed to provide a top wall for each cell reservoir 42 of the cold plate 22, whereby when an energy cell 14 is disposed within each cell reservoir 42 of the cold plate 22, the bus bar header 58 extends over (and in various instances is in contact with) a top end, or terminal end, of each respective energy cell 14. It should be noted that, although the bus bar header 58 is structured or formed to cover a portion of the terminal end of each energy cell 14, the bus bar header 58 is structured or formed such that it does not contact the terminals (e.g., the anode and cathode) of the energy cells 14. By extending over a portion of the terminal end of each respective energy cell 14, the bus bar header 58 provides a large thermally conductive contact surface to which the bus bars 26 can be mounted and be in thermally conductive contact with. Therefore, heat generated by the energy cell(s) 14 that is transferred to and absorbed (i.e., removed from the energy cell(s) 14) by the bus bars 26, can subsequently be transferred to and absorbed (i.e., removed from bus bars 26) by the cold plate 22, thereby cooling the energy cell(s) 14.

Figure 6:
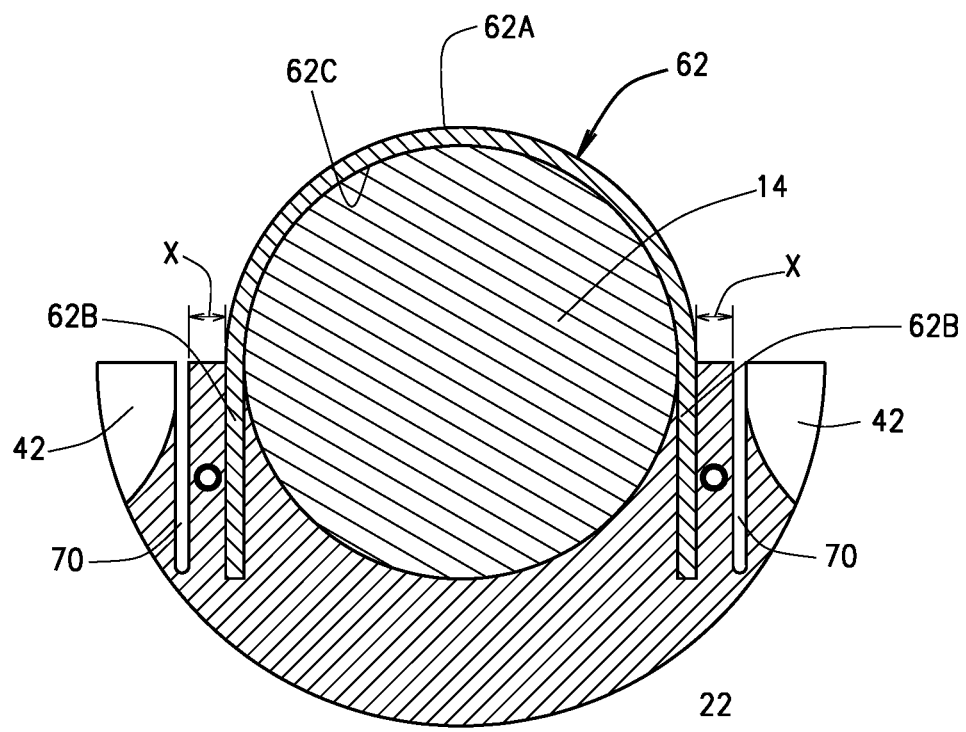
FIG. 6 is a cross-sectional view of a portion of the electrical energy storage cell thermal management system shown in FIGS. 1 and 3A through 4C including an oscillating heat pipe cover, in accordance with various embodiments of the present disclosure.

Referring now to FIGS. 3A, 3B, 3C, 6, 7A and 7B, in various embodiments, the thermal management system 10 can further comprise one or more oscillating heat pipe cover 62 (often referred to herein as simply the OHP cover 62) that is thermally and mechanically connectable to the cold plate 22. More particularly, in such embodiments, the thermal management system 10 comprises at least one OHP cover 62 for each respective cell reservoir 42 of the cold plate 22. In various instances, the thermal management system 10 comprises two or more OHP covers 62 for each respective cell reservoir 42 of the cold plate 22. Each OHP cover 62 is structured and operable to cover the energy cell(s) 14, and at least partially assist in retention of the energy cell(s) 14 within the respective cell reservoir(s) 42, after the energy cell(s) 14 are disposed in the respective cell reservoir(s) 42. Moreover, each OHP cover 62 is structured and operable to absorb (i.e., remove) heat generated from the respective energy cell(s) 14 disposed within the respective cell reservoir 42. As best illustrated in FIG. 6, each OHP cover 62 is structured to comprise a central body section 62A having opposing legs 62B extending therefrom. The central body portion 62A of each OHP cover 62 is structured, shaped or formed to substantially conform to the shape of the respective energy cell(s) 14 that will be disposed within the respective cell reservoir 42. In various embodiments, exemplarily illustrated in FIGS. 2A through 7B, the legs 62B are formed to be substantially straight, or flat, and extend from the central body portion 62A substantially parallel to each other. However, in various embodiments described below, the legs 62B can have alternative shapes, exemplarily illustrated in FIGS. 9 and 10, and have the same OHP cooling functionality as described with regard to FIGS. 2A through 7B.

Moreover, the central body portion 62A each OHP cover 62 is structured, shaped or formed to have substantially the same shape as the respective energy cell(s) 14. For example, in various instances wherein the energy cell(s) 14 is/are cylindrical, the central body portion 62A of each OHP cover 62 is structured, shaped or formed to have semi-cylindrical (or any other portion of a cylinder) shape. Therefore, when one or more energy cell(s) 14 is/are disposed within a respective cell reservoir 42, a large portion (e.g., 100%, 95%, 90%, 85%, 80%, etc.) of an outer surface of the portion of the respective energy cell 14 that is not disposed within the respective cell reservoir 42 is in good thermally conductive contact with an inner surface 62C of the central portion 62A of the respective one or more OHP cover(s) 62. More specifically, a large portion (e.g., 100%, 95%, 90%, 85%, 80%, etc.) of the surface area of the outer surface of the portion of the energy cell(s) 14 that is/are not disposed within the respective cell reservoir(s) 42 and is covered by the respective OHP cover 62 is in good thermally conductive contact with the inner surface of the respective OHP cover 62.

Figure 7A:
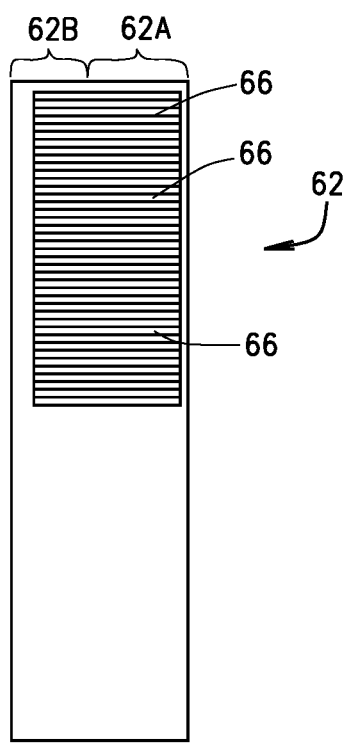
FIG. 7A is an exemplary illustration of the oscillating heat pipe cover shown in FIG. 6 having a portion of an outer surface thereof removed to illustrate an internal meandering multi-pass heat pipe channel formed within the oscillating heat pipe cover, in accordance with various embodiments of the present disclosure.
Figure 7B:
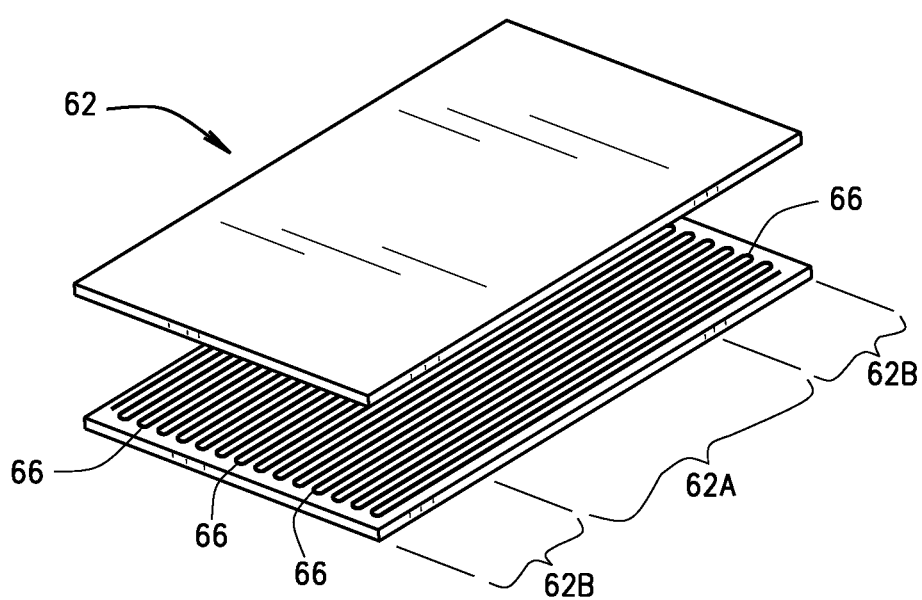
FIG. 7B is an exemplary illustration of the oscillating heat pipe cover shown in FIGS. 6 and 7A flattened out to more clearly illustrate the meandering multi-pass heat pipe channel formed within the oscillating heat pipe cover, in accordance with various embodiments of the present disclosure.

Referring particularly to FIGS. 7A and 7B each OHP cover 62 comprises a meandering multi-pass oscillating heat pipe channel 66 formed internally within the respective OHP cover 62. Each OHP cover 62 can be fabricated from any desirable material (e.g., aluminum, copper, or other metals as well as ceramics, plastics, or composites including those comprised of phase change materials) and the OHP channel 66 can be formed therein using any desirable process. For example, in various instances, the OHP channel 66 can be cut or etched into base sheet of the respective OHP cover 62, and then hermetically sealed with a top sheet after a saturation fluid is disposed within the OHP channel 66. Alternatively, in various instances the OHP cover 62 can be fabricated using and additive process (e.g., 3D printing) that include disposing the saturation fluid within the OHP channel 66 prior to completion of the process.

Particularly, in various embodiments, the OHP channel 66 is a meandering multi-pass capillary channel that is filled with a saturation fluid (referred to herein as the OHP fluid). The capillary dimensions (e.g., small dimensions) of the OHP channel 66 force the OHP fluid into a train of liquid plugs and vapor bubbles. As heat is absorbed from the energy cell(s) 14 by the OHP cover 62, evaporation and condensation of the OHP fluid occur that cause a pressure imbalance from the evaporator region(s) of the OPH channel 66 to condenser region(s) of the OHP channel 66. This pressure imbalance forces the OHP fluid to move, transferring heat (e.g., both latent and sensible heat) from the evaporation portion(s) to the condenser portion(s), thereby removing heat from, and cooling, the respective energy cell(s) 14. More specifically, when heat is absorbed at the evaporator region(s) of the OHP channel 66, bubbles are formed by partial vaporization of the OHP fluid within the channel in the evaporator region. The bubble's expansion is limited radially by the fixed diameter of the OHP channel 66 and thus, the bubble expands axially (i.e., along the length of the OHP channel 66). The axial-wise expansion dislodges neighboring plugs/bubbles in a first portion of the OHP channel 66 and forced them away from the evaporation region(s). The dislodged vapor phase OHP fluid moves through the OPH channel 66 to a condenser region where the heat of the vapor phase OHP fluid is rejected such that the vapor phase OHP fluid converts back to liquid phase. Hence, heat is removed from the energy cell(s) 14 at the evaporator region(s) and transferred to the condensation region(s), thereby removing the heat from, and cooling, the respective energy cell(s) 14. While in the condenser region(s), the vapor phase OHP fluid is cooled and converts back to the liquid phase plug, which then moves back to the evaporator region(s) to repeat the vaporization-condensation cycle to continuously remove heat from, and cool, the respective energy cell(s) 14. In various instances wherein the OHP channel 66 pattern includes 180-degree turns, some of the plugs/bubbles move through the turns and are directed back toward the evaporator region in a second portion of the OHP channel 66 adjacent to the first portion.

Referring again to FIGS. 3A, 3B, 3C, 6, 7A and 7B, as described above, each OHP cover has one or more evaporator regions through which one or more portion of the OHP channel 66 passes, and one or more condenser regions through which one or more portion of the OHP channel 66 passes. In various embodiments, the evaporator region(s) is/are located in within the central body portion 62A of the respective OHP cover 62, and the condenser region(s) is/are located in the legs 62B of the OHP cover 62. As also described above, heat is removed or extracted from vapor phase OHP fluid as the OHP fluid is forced to move through the portion(s) of the OHP channel 62 that lie within the condenser region(s) (e.g., within the legs 62B). As illustrated in FIGS. 3A, 3B, 3C, 4A, 4B, 4C and 6, in various embodiments, the legs 62B are connectable to the cold plate 22. Accordingly, the heat removed from the energy cell(s) 14 by the OHP fluid and transferred to the condenser region(s) (e.g., the legs 62B) is extracted or removed from the legs 62B (more particularly from the vapor phase OHP fluid flowing though the regions of OHP channel 66 running through the legs 62B) and transferred to the cold plate 22. As described above, heat absorbed by the cold plate 22 is removed from the cold plate 22 via the cold plate coolant flowing through the coolant channel 50 within the cold plate.

As exemplarily shown in FIG. 6, in various embodiments, the cold plate 22 includes a pair of leg receptacles 70 for each respective cell reservoir 42 of the cold plate 22. The leg receptacles 70 are slots formed within the cold plate 22 along opposing sides of each cell reservoir 42 that are structured to receive at least a portion of the OHP cover legs 62B. More particularly, the leg receptacles 70 are structured and sized to receive the OHP cover legs 62B in a thermally conductive manner such that heat within the legs 62B, more particularly heat carried by vapor phase OPH fluid flowing through the OHP channel 66 within the legs 62B, is efficiently extracted from the legs 62B and vapor phase OPH fluid and transferred to cold plate 22. For example, in various embodiments, the leg receptacles 70 are structured and sized to receive the legs 62B in a substantially tight friction fit manner such that the generally all of the surface of the legs 62B that are inserted into the leg receptacles 70 are in thermally conductive contact with cold plate 22 when the OHP cover(s) 62 is/are installed over the respective energy cell(s) 14 and connected to the cold plate 22. Alternatively, a thermally conductive, paste, gel or grease can placed in the leg receptacles 70 prior to insertion of the OHP cover legs 62B such that the legs 62B are in thermally conductive contact the cold plate 22. Any other method or means of thermally conductively connected the OHP cover legs 62B to the cold plate 22 are within the scope of the present disclosure.

Figure 6B:
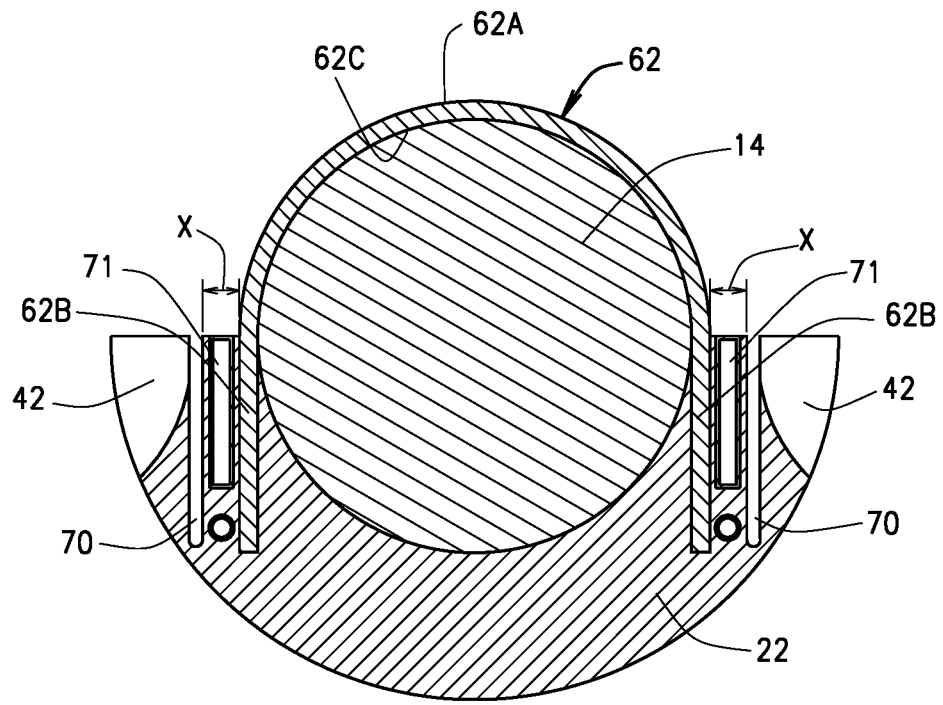
FIG. 6B is a cross-sectional view of a portion of the electrical energy storage cell thermal management system shown in FIGS. 1 and 3A through 4C including an oscillating heat pipe cover, in accordance with various other embodiments of the present disclosure.

Referring now to FIG. 6B, in various embodiments, each OHP cover 62 that fits into leg receptacle 70 can be separated from adjacent OHP covers 62 and leg receptacle 70 with a thermally insulating feature 71 disposed between energy cells 14. The thermally insulating feature 71 can be a gas filled void, vacuum void, phase change material void or otherwise filled with a non-thermally conductive media to further prevent heat transfer from adjacent energy storage cells 14.

Referring now to FIGS. 4A, 4B, 4C, 5, 6, 7A and 7B, in various embodiments, the thermal management system 10 can comprise the cold plate 22 having the bus bar header 58 and the one or more OHP covers 62. Accordingly, in such embodiments, heat generated by the energy cell(s) 14 can be efficiently extracted or removed from the top and/or terminals of the energy cell(s) 14 via the bus bar header 58 (as described above with regard to Figures 2A, 2B, 2C and 5), from the portion of the energy cell(s) 14 in contact with the OHP cover(s) 62 (as described above with regard to FIGS. 3A, 3B, 3C, 6, 7A and 7B), and from the portion of the energy cell(s) 14 in contact with cold plate 22 (as described above with regard to FIGS. 2A, 2B, 2C, 3A, 3B, 3C, 4A, 4B and 4C).

Referring now to FIGS. 2B, 2C, 3B, 3C, 4B and 4C and 6, in various instances of the embodiments wherein the thermal management system 10 comprise two or more OHP covers 62, the thermal management system 10 can be configured such that the OHP covers 62 do not contact each other and are therefore thermally isolated from each other. For example, in various instances the OHP cover leg receptacles 70 formed within the cold plate 22 can be spaced apart such that when the legs 62B of the respective OHP covers 62 are inserted into the leg receptacles 70, the OHP covers 62 are physically separated and thermally isolated from each other by a distance X (see FIG. 6). Moreover, the energy cells 14 are therefore thermally isolated from each other. Such thermal isolation of the energy cells 14 is effective in preventing the propagation of 'thermal runaway' from the energy cell(s) 14 disposed in one cell reservoir 42 of the cold plate 22 to the energy cell(s) 14 disposed in an adjacent cell reservoir 42. Thermal runaway describes a situation where the reaction rate within the energy cells 14 increases causing increased heat generation, at least a portion of which is attempted be removed by the OHP covers 62. However, if the temperature of any one energy cell 14 rises high enough, the reaction rate increases to an uncontrollable level, creating a positive feedback loop (e.g., thermal runaway) where the temperature of the energy cell 14 can rise rapidly, leading to a violent release of energy. Thermal runaway can be caused by such things as high operating temperatures, as overcharging, over-discharging, short circuiting (both internal or external), and cell damage. Structuring the cold plate 22 of the present disclosure such that the OHP cover leg receptacles 70 are spaced apart by the distance X, physically separates and thermally isolates the OHP covers 62 from each other, thereby deterring or preventing the propagation of thermal runaway.

Additionally, should any one or more energy cells 14 disposed within any single cell reservoir 42 undergo thermal runaway, the working properties of the OHP fluid within each OHP cover 62 will transform the respective OHP cover 62 (or OHP covers if there is more than one OHP cover 62 covering the energy cell(s) 14 within a single cell reservoir 42) into a substantially thermal isolating cover, thereby deterring or preventing the propagation of thermal runaway to adjacent energy cells 14. Specifically, when one cell undergoes thermal runaway, the heat generated by the respective energy cell(s) 14 will exceed a maximum working threshold of the OHP fluid such that the OHP cover(s) 62 experience(s) dryout where the OHP fluid is unable convert from the vapor phase back to the liquid phase due to the excessive high heat generated by the runaway energy cell(s) 14. More specifically, all the OHP fluid will covert to the vapor phase. Hence, the OHP fluid is unable to return from the condenser regions to the evaporator regions and the flow or cycling of the OHP fluid within the OHP channel 66 stops. Therefore, all heat transferring function (i.e., all the cooling function) of the OHP cover 62 via the OHP fluid ceases. Consequently, the thermal conductivity of the OHP cover 62 will drop below that of the base material, as the hollow OHP channel 66 volume will be extremely ineffective at transferring heat. In such instances, the OHP cover 62 immediately changes from a highly effective heat transfer device, to a poor heat transfer device, effectively insulating the runaway energy cell(s) 14 from the rest of the package, and particularly from adjacent OHP covers 62 and the energy cell(s) 14 therewithin. In various instances, the OHP fluid can be selected to have a desired maximum conversion temperature threshold such that when the heat generated by the respective energy cell(s) 14 exceeds the maximum conversion temperature threshold, the OHP fluid will no long covert from the vapor phase back to the liquid phase and the OHP cover(s) 62 will undergo OHP fluid dryout, as described above. In such instances the OHP cover(s) 62 will be a thermal barrier to the heat from the energy cell(s) 14 disposed in a first energy cell reservoir 42 from propagating to an energy cell 14 disposed in an adjacent energy cell reservoir 42.

Additionally, because the cell cover(s) 34 of thermal management system 10 can be fabrication or constructed of plastic or other generally not thermally conductive material, the only heat transfer path for the energy released by the runaway energy cell(s) 14 will be through cold plate 22 and the cold plate coolant, which further insulates the runaway energy cell(s) 14 from the rest of the energy cells 14 disposed in the thermal management system 10.

In various non-limiting embodiments of the present disclosure, the cold plate 22 can be fabricated of generally any suitable high thermally conductive material such as aluminum. Specifically, the high thermal conductivity allows designers to reduce temperatures of the energy cell(s) 14 and reduce spacing between energy cell(s) 14 (e.g., between cell reservoirs 42), or both. This is by way of Fourier's heat conduction equation;

$$Q = kA\frac{\Delta T}{\Delta x}$$

where Q is the total heat load, k is the thermal conductivity, $\Delta T$ is the temperature difference, and $\Delta x$ is the distance across which the temperature difference occurs.

For a given heat load Q from the energy cell(s) 14, a maximum temperature difference $\Delta T$ allowable by design, and a fixed distance $\Delta x$ by way of energy cell choice, the cross sectional area A between energy cell(s) 14 (e.g., between cell reservoirs 42) for heat to be transferred can be determined by the thermal conductivity k of the material. When the thermal conductivity is increased, the cross sectional area A can be reduced while maintaining the same heat load and temperature difference, resulting in a more compact thermal management system 10. If, however, the cross sectional area A between energy cell(s) 14 (e.g., between cell reservoirs 42) is fixed instead of the temperature difference, the increase in thermal conductivity will result in a lower temperature difference. With the cold plate coolant at a relatively fixed temperature, the result is lower outer surface, or sidewall, temperatures of the energy cell(s) 14. Additionally, because the OHP cover 62, as disclosed herein, is responsible for transferring heat from the remote region of the energy cell(s) 14 (e.g., the regions of the energy cell(s) 14 in contact with the central body portion 62A of the OHO cover(s)) to the cold plate 22 and hence to the cold plate coolant, the cell cover(s) 34 can be constructed of a lightweight plastic.

Figure 8:
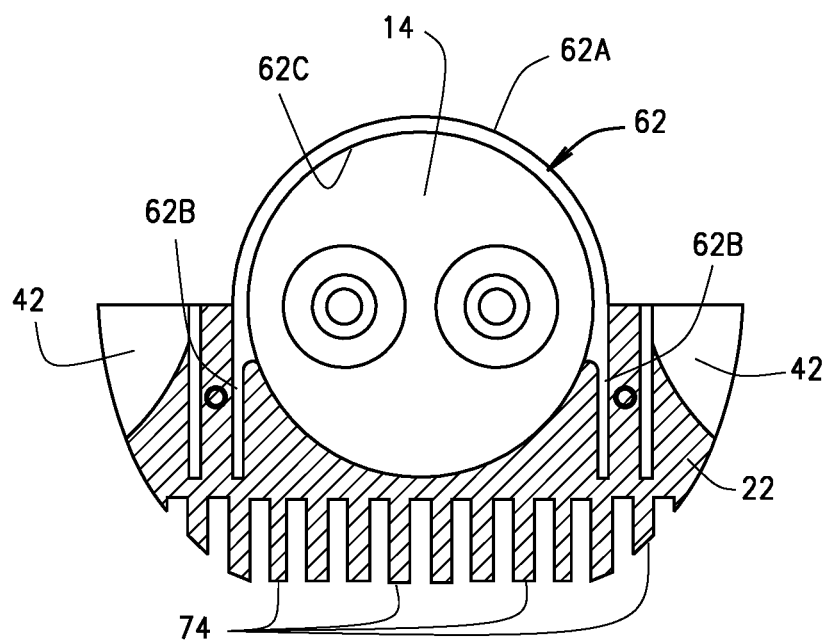
FIG. 8 is a cross-sectional view of a portion of a portion of the electrical energy storage cell thermal management system shown in FIGS. 1 through 7B, wherein a cold plate of the thermal management system includes a plurality of cooling fins, in accordance with various embodiments of the present disclosure.
Figure 9:
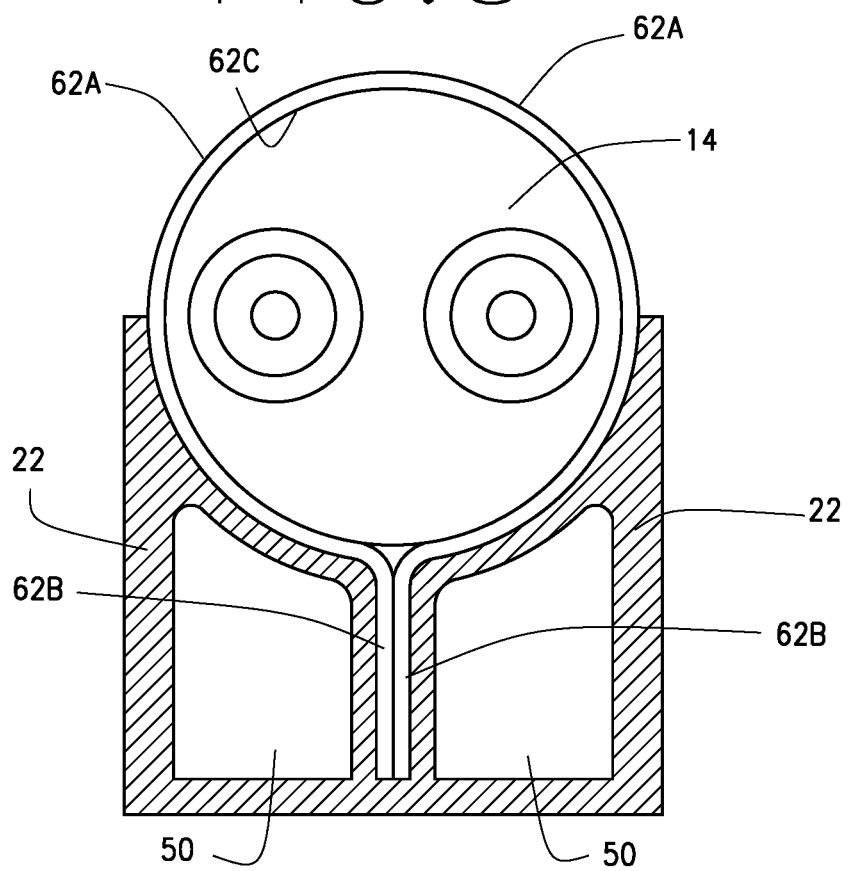
FIG. 9 is a cross-sectional view of a portion of a portion of the electrical energy storage cell thermal management system shown in FIGS. 1 through 7B, wherein an oscillating heat pipe cover of the thermal management system encompasses an energy cell disposed in the thermal management system, in accordance with various embodiments of the present disclosure.

Referring now to FIGS. 8, 9 and 10, although the thermal management system 10 has been exemplarily illustrated in FIGS. 2A through 7B in accordance with various embodiments and instances wherein the OHP cover(s) 62 and the cold plate 22 have substantially the same construction and/or shape, it is envisioned that in various other embodiments and instances the OHP cover(s) 62 and/or the cold plate 22 can provide the same energy cell cooling functionality, but have a different construction and/or shape, and remain within the scope of the present disclosure.

For example, as exemplarily illustrated in FIG. 8, in various embodiments the cold plate 22 can be constructed to comprise cooling fins 74 that function to remove or extract heat from the cold plate, and hence from the energy cell(s) 14 and OHP cover(s) 62, instead of the cooling channel 50 exemplarily illustrated in FIG. 5. In such embodiments, heat extracted or absorbed by the cold plate 22 from the energy cell(s) 14 and the OHP cover(s) 62 is extracted from the cold plate 22 via air cooling utilizing the cooling fins 74. More particularly, the heat absorbed by the cooling plate 22 (as described above) migrates to the cooling fins 74 where ambient air (or cooled air) is allowed to flow, or is forced (e.g., blown), through the gaps between the cooling fins 74, around and across the cooling fins 74, thereby extracting the heat from the cooling fins 74 and cooling the cold plate 22. As another example, as exemplarily illustrated in FIG. 9, in various embodiments the OHP cover(s) 62 can be structured and formed to fully wrap and encompass substantially the entire outer surface, or a large portion of the outer surface (e.g., 95%, 90%, 85%, 80%, etc.) of the energy cell(s) 14. In such instances, portions of the OHP cover(s) 62 will be disposed between, and in thermally conductive contact with, the energy cell(s) 14 and the cool plate 22. Accordingly, such portions of the OHP cover 62 would function to remove or extract heat from the portion of the energy cell(s) 14 surface(s) they are in contact with, and the sections of the OHP channel 66 disposed therein would include condenser regions whereby the OHP fluid removes heat from the remainder of the surface(s) of the energy cell(s) 14, as described above. As yet another example, as exemplarily illustrated in FIG. 10, in various embodiments, each OHP cover 62 can be structured and formed to enclose a plurality of energy cells 14 (e.g., two, three, four, etc.). In such instances, each portion of the multi-cell OHP cover 62 that encompass an energy cell 14 will function as described above with regard to FIG. 9.

Referring now to FIGS. 2A, 2B, 2C, 4A, 4B, 4C, 11A and 11B, as described above, in various embodiments the cold plate 22 includes the bus bar header 58 that provides a large thermally conductive contact surface to which the bus bars 26 can be mounted such that heat absorbed by the bus bars 26, can subsequently be absorbed by the cold plate 22 to cool the energy cell(s) 14. In various instances of such embodiments (best illustrated in FIGS. 11A and 11B), each bus bar 26 can be structured or formed to includes a heat transfer barrier channel or slot 78 that divides each respective bus bar 26 into a first portion 26A (e.g., a first half 26A) and a second portion 26B (e.g., a second half 26B). Importantly, when each bus bar 26 is connected to the bus bar header 58 the first portion 26A extends over a first energy cell reservoir 42 of the cold plate 22, and the second portion 26B extends over a second, i.e., adjacent, energy cell reservoir 42 of the cold plate 22. Accordingly, when one or more energy cell 14 is disposed within the first and second/adjacent energy cell reservoirs 42 one of the terminals of energy cell(s) 14 in the first energy cell reservoir 42 will be in physical and thermal contact with the first portion 26A of the respective bus bar 26, and one of the terminals of energy cell(s) 14 in the second/adjacent energy cell reservoir 42 will be in physical and thermal contact with the second portion 26B of the respective bus bar 26. Therefore, heat generated by the energy cell(s) 14 in the first energy cell reservoir 42 will be absorbed by the respective bus bar 26 at the first portion 26A, and the heat generated by the energy cell(s) 14 in the second/adjacent energy cell reservoir 42 will be absorbed by the respective bus bar 26 at the second portion 26B.

For each bus bar 26, the heat transfer barrier channel 78 extends into the bus bar 26 a depth Y from a top surface 26T toward a bottom surface 26D of the bus bar 26. The depth Y can be any desired portion of a total thickness T of the bus bar 26 that will provide a substantial barrier to heat transferring or migrating from the first portion 26A to the second portion 26B, or vice-versa. For example, in various embodiments, the depth Y can be 95%, 90%, 85%, 80%, etc., of the total thickness T. More specifically, the heat transfer barrier channel 78 of each respective bus bar 26 functions as a heat transfer barrier that chokes and reduces the amount of heat that is transferred from the terminal of the energy cell(s) 14 in the first energy cell reservoir 42 to the terminal of the energy cell(s) 14 in the second/adjacent energy cell reservoir 42. Therefore, in the instance wherein the energy cell(s) 14 within one energy cell reservoir 42 experience thermal runaway, the excessive heat generated by the runaway energy cell(s) 14 will be transferred from the first bus bar portion 26A to the second bus bar portion 26B, and vice-versa. More particularly, the heat transfer barrier channel 78 in each bus bar 26 helps to thermally isolate the energy cell(s) 14 disposed in any one energy cell reservoir 42 from the energy cell(s) 14 disposed in an adjacent energy cell reservoir 42. Additionally, since the heat transfer barrier channel 78 extends only partially through the respective bus bar 26, i.e., extends the depth 7 into the respective bus bar 26, the entire surface area of the bottom surface 26D of each bus bar 26 is in thermally conductive contact with cold plate header 58. Therefore, heat from each entire bus bar 26 (i.e., heat from the first portion 26A and the second portion 26B) is efficiently removed or extracted from each bus bar 26, as described above. Furthermore, the heat transfer barrier channel 78 of each bus bar 26 functions forces the heat absorbed by each of the first portion 26A and the second portion 26B to migrate to the bottom surface 26D, thereby allowing for more efficient heat removal or extraction from each bus bar 26 by the cold plate 22.

The above description and figures disclose various embodiments of the thermal management system 10 of the present disclosure. It is envisioned that one or more component, portion or part, or method for fabricating such one or more component, portion or part of the thermal management system 10 can be structured, formed and/or fabricated in accordance with various other embodiments and remain within the scope of the present disclosure. For example, a non-limiting list is provided below setting forth various envisioned alternate embodiments.

Alternative Embodiments

Embedding OHPs in the casing of each energy cell 14
OHP covers 62 that connect to multiple cold plates
Multiple OHP covers 62 for a single energy cell 14
Single pass coolant channels 50 in the cold plate 22
Natural and/or forced convection gas coolant for cooling the cold plate 22
Evaporative cooling for the cold plate 22 rather than liquid cooling The systems and methods of the present disclosure can benefit customers interested in energy storage solutions such as the Department of Defense, automobile manufacturers, and renewable energy and power generation providers, by allowing significantly increased electrical loads (both charging and discharging) while maintaining safe operation of the energy cell(s) 14. This results in increased capacity by allowing more dense packing or arrangement of a plurality of energy cells 14 within the thermal management system 10 and increased power generation from the resulting electrical power storage device 18 by allowing higher charging and discharge rates of the energy cell(s) 14.

Some exemplary, non-limiting example of the advantages of the systems and methods of the present disclosure are as follows:

The use of the oscillating heat pipe cover(s) 62 allows for:
Lower pressure drop of the coolant loop 50 in the cold plate 22
Low temperature gradient across the surface of the respective energy cell(s) 14
A compact form factor
A lightweight electrical power storage device 18
Thermal isolation of each cell 14 from its neighboring cells 14 while maintaining thermal connection to the coolant channel 50

Referring now to FIG. 12, as described above, the energy cell(s) 14 can have any desired shape (e.g., cylindrical, a hexahedron, an octagonal prism, an ellipsoid, etc.). For example, in various embodiments, the electrical power storage device 18 can comprise prismatic shaped energy cells 14 and complimentary prismatic shaped OHP covers 62 that can be disposed along one or more faces of the prismatic shaped energy cells 14 and/or at least partially envelope the prismatic shaped energy cells 14. In such instances, the prismatic shaped OHP covers 62 will include the heat pipe channel 66 and working fluid disposed therein, and function to remove heat from the prismatic shaped energy cells 14, as described above with regard to FIGS. 4A through 7A. Additionally in such instances, the legs 62B of the OHP covers 62 can be exposed to any desired heat exchange device, mechanism, coolant, liquid, gas, material, etc. that functions to remove the heat from the condensation regions of the heat pipe channel 66 that are disposed within the legs 62B of the OHP covers 62. For example, the legs 62B of the OHP covers 62 can extend beyond the outer walls of the electrical power storage device 18 and be exposed to a coolant (e.g., air, water, refrigerant, etc.) that flows between and/or around the legs 62B, thereby removing heat from the OHP covers 62, and therefrom from the energy cells 14, as described above with regard to FIGS. 4A through 7A.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A thermal management system for an electrical energy cell, said system comprising:
a cold plate cell holder comprising at least one energy cell reservoir structured to retain at least one electrical energy cell and to surround a first portion of a surface of the at least one energy cell when the at least one energy cell is retained therein, the cold plate cell holder structured and operable to thermally cool the at least one energy cell via heat absorption from the first portion of the surface of the at least one energy cell when the at least one energy cell is retained therein; and
at least one oscillating heat pipe cover, each of the at least one oscillating heat pipe cover independently disposable around a second portion of the surface of at least one respective energy cell when the at least one respective energy cell is retained within the cold plate cell holder, each of the at least one oscillating heat pipe cover comprising at least one oscillating heat pipe disposed internally therein, and each of the at least one oscillating heat pipe cover thermally and mechanically connectable directly to the cold plate cell holder when disposed around the at least one respective energy cell such that each of the at least one oscillating heat pipe cover is directly connected to, and in thermally conductive contact with, the cold plate and such that the at least one respective energy cell is thermally isolated, and whereby via the direct connection and thermally conductive contact, each of the at least one oscillating heat pipe cover will independently transfer heat absorbed from the second portion of the surface of the respective at least one energy cell directly to the cold plate cell holder.

2. The system of claim 1, wherein the at least one oscillating heat pipe cover is shaped to have substantially the same shape as an exterior shape of the second portion of the at least one energy cell that the at least one oscillating heat pipe cover is disposable around.

3. The system of claim 1, wherein the at least one oscillating heat pipe cover has at least one meandering heat pipe channel formed internally therein, and wherein the at least one meandering heat pipe channel is partially filled with a cooling fluid.

4. The system of claim 3, wherein the cooling fluid is selected to have thermal characteristics such that when the at least one oscillating heat pipe cover is disposed around the second portion of the surface of the at least one energy cell and thermally and mechanically connected to the cold plate cell holder, the cooling fluid will absorb heat from the at least one energy cell causing portions of the cooling fluid to change from a liquid phase to a vapor phase causing thermal expansion of the cooling fluid whereby the cooling fluid will move within the meandering heat pipe channel and transfer the absorbed heat to the cold plate cell holder via the thermal and mechanical connection of the oscillating heat pipe cover to the cold plate cell holder.

5. The system of claim 4, wherein the cooling fluid in the at least one meandering heat pipe channel is selected such that when a temperature of the at least one energy cell disposed in a first one of the at least one energy cell reservoirs and thermally isolated by the respective at least one heat pipe cover exceeds a maximum threshold, the heat absorbed by the cooling fluid will cause the cooling fluid to cease to transfer the absorbed heat to the cold plate cell holder such that the respective at least one oscillating heat pipe cover will be a thermal barrier to the heat from the at least one energy cell in the first energy cell reservoir propagating to an energy cell disposed in an energy cell reservoir adjacent the first energy cell reservoir.

6. The system of claim 1, wherein the at least one oscillating heat pipe cover comprises a plurality of oscillating heat pipe covers disposable around the one or more energy cells disposed within a single energy cell reservoir.

7. The system of claim 1, wherein the cold plate cell holder comprises a bus bar header to which one or more bus bar of the system can be physically and thermally connected.

8. The system of claim 7, wherein each bus bar comprises a heat transfer barrier that extends into the respective bus bar from a top surface of the respective bus bar toward a bottom surface of the respective bus bar.

9. The system of claim 1, wherein the cold plate cell holder comprises a coolant channel that meanders through an interior of the cold plate, and through which a coolant is circulated to remove heat from the cold plate cell holder.

10. The system of claim 9, wherein the coolant circulated through the cold plate cell holder coolant channel comprises one of a liquid, a gas, and a phase change medium.

11. An electrical power storage device, said device comprising:
  at least one electrical energy cell; and
  a thermal management system for the at least one energy cell, wherein the thermal management system comprises:
    a cold plate cell holder comprising:
      at least one energy cell reservoir structured to retain the at least one energy cell and surround at least a first portion of a surface of the at least one energy cell, the cold plate cell holder structured and operable to thermally cool the at least one energy cell via heat absorption from the first portion of the surface of the at least one energy cell; and
      a bus bar header to which one or more bus bar of the system can be physically and thermally connected; and
    at least one oscillating heat pipe cover, each of the at least one oscillating heat pipe cover independently disposed around a second portion of the surface of at least one respective energy cell, each of the at least one oscillating heat pipe cover comprising at least one oscillating heat pipe disposed internally therein, and each of the at least one oscillating heat pipe cover thermally and mechanically connected directly to the cold plate cell holder such that each of the at least one oscillating heat pipe cover is directly connected to, and in thermally conductive contact with, the cold plate and such that the at least one respective energy cell is thermally isolated, and whereby via the direct connection and thermally conductive contact, each of the at least one oscillating heat pipe cover will independently transfer heat absorbed from the second portion of the surface of the at least one energy cell directly to the cold plate cell holder.

12. The device of claim 11, wherein the at least one oscillating heat pipe cover is shaped to have substantially the same shape as an exterior shape of the second portion of the at least one energy cell that the at least one oscillating heat pipe cover is disposed around.

13. The device of claim 11, wherein the at least one oscillating heat pipe cover has at least one meandering heat pipe channel formed internally therein, and wherein the at least one meandering heat pipe channel is partially filled with a cooling fluid.

14. The device of claim 13, wherein the cooling fluid is selected to have thermal characteristics such that the cooling fluid will absorb heat from the at least one energy cell causing portions of the cooling fluid to change from a liquid phase to a vapor phase causing thermal expansion of the cooling fluid whereby the cooling fluid will move within the meandering heat pipe channel and transfer the absorbed heat to the cold plate cell holder via the thermal and mechanical connection to the cold plate cell holder.

15. The device of claim 14, wherein the cooling fluid is selected to have thermal characteristics such that when a temperature of the at least one energy cell disposed in a first one of the at least one energy cell reservoirs, and thermally isolated by the respective at least one heat pipe cover, exceeds a maximum threshold, the heat absorbed by the cooling fluid will cause substantially all the cooling fluid to change to the vapor phase whereby the vapor phase cooling fluid will no longer transfer heat to the cold plate cell holder such that the respective at least one oscillating heat pipe cover will be a thermal barrier to the heat from the at least one energy cell disposed in the first energy cell reservoir from propagating to an energy cell disposed in an energy cell reservoir adjacent the first energy cell reservoir.

16. The device of claim 11, wherein the at least one oscillating heat pipe cover comprises a plurality of oscillating heat pipe covers disposed around the one or more energy cells disposed within a single energy cell reservoir.

17. The device of claim 11, wherein the at least one energy cell comprises a plurality of energy cells retained within a plurality of energy cell reservoirs of the cold plate cell holder, and the at least one oscillating heat pipe cover comprises a plurality of oscillating heat pipe covers that are physically connected to the cold plate cell holder such that there is a space between adjacent oscillating heat pipe covers.

18. The system of claim 11, wherein each bus bar comprises a heat transfer barrier that extends into the respective bus bar from a top surface of the respective bus bar toward a bottom surface of the respective bus bar.

* * * * *